Patented June 15, 1937

2,084,131

UNITED STATES PATENT OFFICE 2,084,131

AGE-RESISTER

Albert M. Clifford, Stow, Ohio, assignor to Wingfoot Corporation, Wilmington, Del., a corporation of Delaware No Drawing. Application April 18, 1935, Serial No. 17,140

16 Claims. (Cl. 18—50)

This invention relates to the treatment of rubber and the like for the purpose of retarding deterioration thereof and, more particularly, it relates to age resisters or antioxidants intended to be incorporated in or applied to rubber and similar materials to increase the useful life of such materials.

The new age resisters are obtained by appropriate chemical treatment of certain coal tar fractions to form amino or phenolic compounds therefrom and then further reacting with an amine or a phenol, respectively, to form secondary amines, although the primary amines obtained by treatment of the coal tar fraction may also be used as antioxidants without further treatment other than purification. The age resister or antioxidant is a complex mixture of compounds. Among the objects of the invention is to provide a method of treating rubber with these complex mixtures to retard deterioration, loss of tensile strength and elasticity as a result of the effect of air, heat, light or other influences. Another object of the invention is to provide an improved antioxidant or age resister which can be readily incorporated into rubber and which will not bloom on the surface of the article after incorporation and to provide a rubber compound treated with the same. Other objects will in part be obvious and will in part appear hereinafter.

Certain individual compounds have been isolated from coal tar fractions and treated to form amino compounds which have been tested in rubber for their antioxidant effect, among these being the amino acenaphthenes, the amino phenanthrenes, and the amino fluorenes, as set forth in United States Patents Nos. 1,809,799, 1,894,231 and 1,906,314. It has now been found that certain fractions of coal tar may be treated by chemical reagents and all of the secondary amino bodies thus formed used, without separation of the various individual compounds, as an antioxidant in rubber. The mixture has the advantage over the individual compounds that its melting point is lower than that of most of its constituents so that it may be readily dispersed through the rubber during mixing and, the tendency to crystallize being inhibited by the complexity of the mass, there is little or no tendency for the antioxidant to bloom on the surface of the rubber article after manufacture. Also, the age resister is cheaper to make and more economical to use since no purification steps are performed and all of the reaction mass is utilized. A coal tar fraction boiling between the approximate limits of 170° C. and about 350° C. can be used for the purposes of the present invention. However, it is preferred to use a fraction boiling between 170° C. and 250° C., since such a fraction gives a higher percentage of active material in the resulting antioxidant.

A coal tar oil fraction taken between these limits contains a number of compounds of moderately high molecular weight, mostly hydrocarbons, such as methyl naphthalene, acenaphthene, fluorene, phenanthrene, cumene, indene, pyrene, diphenyl oxide, traces of carbazol, etc. One of the fractions utilized herein is termed the methyl naphthalene fraction due to the large proportion of this constituent which it contains. Among the coal tar fractions which have been found to be amenable to treatment in accordance with the present invention to obtain valuable age resisters, may be mentioned the following:

A fraction, denominated fraction A for purposes of identification, was prepared from crude coke oven coal tar, specific gravity 1.10–1.25, with a maximum free carbon content of 15% and a maximum ash of 0.50%. The coal tar was subjected to distillation, first under atmospheric pressure up to a temperature of 230–250° C. and then under reduced pressure until no more distillate could be obtained. The final distillate came over at about 350° C. at 10 mm. pressure and the total distillate comprised a fluorescent oil, darkening on exposure to light. There was observed during the distillation operation a crystalline material appearing in the distillate at about 100° C. and again at 180° C. but this dissolved in the main distillate on warning. The density of the distillate was 1.078 g/cc. at 20° C. and the alkali-insoluble portion amounted to 90% of the whole distillate. The remaining alkali-soluble portion consists of phenols, cresols, etc., which were not removed from the bulk of the distillate but, rather, the whole distillate was subjected to nitration and reduction to obtain primary amino derivatives.

Another coal tar oil, termed fraction B, is a practically neutral special oil containing no phenolic bodies and having a boiling point between 225° C. and 300° C.

Another neutral oil, called fraction C, had a boiling point between 180° C. and 245° C.

The coal tar fraction may be treated in various ways, in accordance with the invention, to yield antioxidants. Thus, amino bodies may be derived therefrom by nitration and reduction, or, phenolic bodies may be obtained by sulfonation and subsequent fusion with caustic soda. Of course, any feasible method of introducing amino or hydroxy groups may be followed. The amines or phenols respectively, are then separated from the unreacted residue of the coal tar and either used as such, in the case of the amines, as an antioxidant in rubber, or are further reacted with an appropriate phenol, or alcohol or amine, or a plurality of such, to yield a mixture of secondary amino compounds which is the preferred antioxidant.

The amination of these fractions will be illustrated below, although it is to be understood that the invention is not limited to such examples but is capable of wide variation within the scope of the invention.

*Example 1*

A mixture of 240 cc. of concentrated nitric acid (71%) and 180 cc. of sulphuric acid (96%) was prepared and cooled. The mixed acid was then added dropwise to 430 grams of oily distillate, termed fraction A above, with stirring and cooling, the temperature during the first half of the nitration being maintained below 42° C. Near the end of the nitration, the temperature was permitted to rise to 60° C. Acetic acid was added in small portions (a total of 125 cc.) from time to time to reduce the viscosity of the mixture. After the addition of the acid was completed, the mixture was allowed to stand over night and was washed with six to eight changes of hot water. The nitro compounds, largely constituting the resulting moist composite, were then reduced by treating with approximately 10 grams of ammonium chloride in concentrated aqueous solution, followed by the addition in small portions, with stirring, of 700 grams of degreased iron filings. The reaction was initiated by warming slightly and thereafter controlled by the addition of the iron and small amounts of water to compensate for evaporation. The mass finally obtained as a result of the reduction was dried and extracted with benzene, the amines being preferably isolated from the benzene extract as their hydrochlorides, (by saturation with dry HCl) and then liberated from the hydrochloride by warming with 20% caustic soda solution. The mixed amines thus obtained form a dark-colored, stiff, tarry mass. The product may be used directly as an antioxidant or age resister for rubber but is preferably further reacted to form secondary amines in a manner to be described hereinafter.

Coal tar fraction B, as defined above, may be similarly nitrated and reduced in accordance with the foregoing procedure, or zinc and hydrochloric acid may be used in place of iron filings and hydrochloric acid for the reduction. The composite primary amines thus obtained constitute a brown oil which may also be used as an antioxidant for rubber. Likewise, fraction C may be nitrated and reduced in the manner described to yield composite amines constituting a mass having a boiling point between 100–185° C. at 5 mm. and possessing antioxidant properties.

While the foregoing amino composites are satisfactory antioxidants in rubber, it is preferred to react them further with alcoholic or phenolic substances to form mixtures consisting largely of secondary amines. Thus, the mixture may be reacted with various phenolic compounds or mixtures of phenolic compounds, for example, phenols, cresols, xylenols, amino phenols, amino cresols, guaiacol, p-hydroxy phenetole, creosoles, hydroxy biphenyl, alpha and beta naphthol, hydroquinone, resorcinol, pyrocatechol, etc., or with various alcohols, such as methyl, ethyl, propyl, butyl or other alcohols, to produce a mixture of secondary amines. Of course, the nature of the secondary amino complex may be varied by selection of the particular alcohol or phenol, such as phenol itself, for interaction with the amines resulting from treatment of the coal tar fraction. Thus the nature and properties of the final product may be modified by selection of any one, or more than one of the various alcohols or phenols for reaction with the amino complex obtained by treatment of the original coal tar fraction.

Reaction with an alcohol or alcohols results in a mixture of substituted alkyl amino compounds typified as follows: R—NH—CH$_3$, R—NH—CH$_2$—CH$_2$—OH, R—NH—CH$_2$—CH$_2$—O—R', where R is the radical of one of the hydrocarbon or other constituents of the coal tar fraction and R' is an alkyl or aryl radical.

Where the various mixtures of amines are reacted with any of the foregoing phenols, or a mixture of phenols, a composite product consisting largely of secondary diaryl amines results and will contain some or all of the compounds of the following types:

$$R-NH-R$$
$$R-NH-C_6H_5$$
$$R-NH-C_6H_4-CH_3$$
$$R-NH-C_6H_3(CH_3)_2$$
$$R-NH-C_6H_4-CH(CH_3)_2$$
$$R-NH-C_6H_4-O-CH_3$$
$$R-NH-C_6H_4O-C_2H_5$$
$$R-NH-C_6H_4OH$$
$$R-NH-C_6H_4NH_2$$
$$R-NH-C_6H_5NHR'$$
$$R-NH-C_6H_4-C_6H_5$$
$$R-NH-C_6H_4-C_6H_4-NH_2$$
$$R-NH-\text{(naphthyl)}$$

etc., where R is the radical of acenaphthene, methyl naphthalene, fluorene, phenanthrene, cumene, indene, pyrene, etc., and R' is an alkyl or aryl radical.

The following examples illustrate complex mixtures, which may be obtained in accordance with the terms of the invention, it is not limited thereto but is capable of wide variation within its scope.

*Example 2*

Mixed amines resulting from the amination of fraction A in Example 1 above were taken in the amount of 130 grams and autoclaved with 432 grams of cresols (58% of which boiled off up to 212° C.) in the presence of 5 grams of SnCl$_4$ for 12 hours. The temperature during the reaction ranged from 325°–347° C. The reaction product was subjected to distillation to remove excess cresols and the residue, having a boiling point about 250° C., amounted to 186 grams. The dark resinous product was tested in rubber as an antioxidant.

*Example 3*

A mixture of 61 grams of mixed amines obtained by amination of fraction B as outlined above and 50 grams of beta naphthol were heated slowly, in the presence of 0.2 grams of iodine, up to 290° C. during 4½ hours. Water was eliminated slowly. The product was extracted with hot dilute sodium hydroxide, washed, extracted with hot dilute HCl, and the residue, after washing and drying, was obtained as a dark-colored tar, resinous at 15°–20° C. The yield was 89 grams and this product was also tested in rubber.

*Example 4*

In place of reacting the mixed amines from coal tar fraction B with beta naphthol, as in the preceding example, the mixed amines may be autoclaved with mixed cresols, in the ratio of 115 parts of the amines to 410 parts of the cresols. 2.5 grams of aluminum chloride are added and the reaction continued for 14 hours at a temperature of 340°–345° C. The product is then subjected to distillation and the residue, having a boiling point above 150° C. at 4 mm. pressure and amounting to 185 grams, was used in antioxidant tests on rubber.

*Example 5*

The mixed amines from appropriate treatment of fraction C were next reacted, 50 grams of the mixed amines and 50 grams of beta naphthol being mixed together with one cc. of hydriodic acid and heated at 220°–245° C. for 5 hours until evolution of water had ceased. The product was distilled up to 185° C. at 5 mm. and the residue, amounting to 50 grams, was used as an antioxidant.

*Example 6*

The amines from treatment of fraction C were also reacted with mixed cresols, 50 grams of the mixed amines, 450 grams of the mixed cresols, and 2.5 grams of $AlCl_3$ being autoclaved for 14 hours at 340°–345° C. The residue of 97 grams, boiling above 150° C. at 4 mm., was obtained by distillation of the reaction product and constituted the antioxidant which was tested in rubber.

*Example 7*

The procedure by which phenolic bodies are first produced and then reacted with amines to form a mixture of secondary amines is illustrated by this example. Mixed phenolic compounds resulting from sulphonation followed by caustic fusion of fraction B were reacted with aniline in the ratio of 52 grams of the phenolic compounds to 60 grams of aniline. The reaction was carried out in the presence of 1 cc. of hydriodic acid, HI, (50%) under a reflux condenser for 13 hours, the temperature being 180°–200° C. During the course of the reaction, 4 cc. of water were collected. The product was distilled to eliminate excess aniline and the residue was washed with dilute HCl, water, dilute NaOH and finally water, in the order given. The yield was 63 grams of a dark viscous tar which was tested in rubber.

It will be observed that various tar fractions, boiling between about 170° C. and 350° C., may be successfully treated in the manner herein described or the entire fraction boiling between these limits may be so treated. However, it is preferred to act upon a coal tar fraction taken between about 170° C. and 250° C. since a greater concentration of valuable constituents is found in the narrower range.

The mixtures, which may be characterized as complexes of secondary amino compounds, although containing other amino compounds as well, constitute excellent antioxidants in rubber, are readily dispersed therein despite the rather large molecular weight of some of the constituents, and evidence little or no tendency to bloom. Various constituent compounds of the mass may also be used individually as antioxidants in rubber, some of these being methyl amino methyl naphthalene, phenyl acenaphthyl amine, tolyl phenanthryl amine, xylyl acenaphthene amine, phenyl fluorenyl amine, cumidyl methyl naphthylamine, etc.

The antioxidants prepared according to the preceding examples have been tested in a rubber compound made up in accordance with the following formula:

| | Parts by weight |
|---|---|
| Extracted pale crepe | 100.0 |
| Zinc oxide | 5.0 |
| Sulphur | 3.0 |
| Hexamethylene tetramine | 1.0 |
| Stearic acid | 1.5 |
| Antioxidant | 1.0 |

The test pieces were aged for six days in an oxygen bomb at a temperature of 50° C. at a pressure of 150 pounds and the following results obtained:

| Cure | Original | | | | Aged | | | | % Wt. inc. | T. R. |
|---|---|---|---|---|---|---|---|---|---|---|
| | Tens. | Elg. | 500% | 700% | Tens. | Elg. | 500% | 700% | | |
| Mixed amines from oil + cresols | | | | | | | | | | |
| 35/285 | 62 | 785 | 13 | 40 | 100 | 825 | 16 | 52 | .07 | |
| 50 | 102 | 780 | 19 | 64 | 124 | 785 | 22 | 78 | .08 | 121% |
| 70 | 131 | 760 | 24 | 90 | 133 | 735 | 29 | 110 | .16 | |
| Naphthylamino derivative (amines from oil B + β naphthol) | | | | | | | | | | |
| 35/285 | 112 | 875 | 16 | 43 | 117 | 825 | 17 | 54 | .03 | |
| 50 | 126 | 825 | 19 | 61 | 137 | 800 | 21 | 75 | .12 | 104% |
| 70 | 137 | 780 | 25 | 86 | 138 | 755 | 26 | 96 | .17 | |
| Naphthylamino derivative (amines from oil C + β naphthol) | | | | | | | | | | |
| 35/285 | 110 | 850 | 16 | 50 | 120 | 815 | 20 | 64 | .03 | |
| 50 | 128 | 795 | 22 | 75 | 139 | 790 | 25 | 84 | .02 | 105% |
| 70 | 156 | 775 | 28 | 100 | 156 | 750 | 33 | 117 | .01 | |
| Amines from oil C + cresols | | | | | | | | | | |
| 35/285 | 60 | 785 | 14 | 38 | 70 | 760 | 16 | 50 | .03 | |
| 50 | 96 | 760 | 22 | 69 | 104 | 755 | 22 | 75 | .11 | 100% |
| 70 | 122 | 770 | 25 | 82 | 106 | 720 | 26 | 92 | .11 | |

| Cure | Original | | | | Aged | | | | % Wt. Inc. | T. R. |
|---|---|---|---|---|---|---|---|---|---|---|
| | Tens. | Elg. | 500% | 700% | Tens. | Elg. | 500% | 700% | | |
| Amines from oil B cresols | | | | | | | | | | |
| 35/285 | 68 | 800 | 15 | 40 | 85 | 780 | 17 | 55 | .06 | |
| 50 | 88 | 770 | 20 | 60 | 85 | 725 | 22 | 72 | .12 | 98% |
| 70 | 122 | 750 | 27 | 90 | 105 | 715 | 28 | 95 | .21 | |
| Phenyl amino derivative (phenols from oil B aniline) | | | | | | | | | | |
| 35/285 | 74 | 825 | 13 | 36 | 114 | 825 | 18 | 55 | .02 | |
| 50 | 110 | 830 | 16 | 52 | 126 | 800 | 20 | 72 | .04 | 120% |
| 70 | 127 | 765 | 24 | 87 | 136 | 735 | 30 | 112 | .08 | |

In the above table, the column headed T. R. gives the tensile ratio of the sample, under test, i. e., a ratio of the tensile strength after ageing to the tensile strength before ageing. This affords an accurate estimate of the value of the antioxidant.

The aminated coal tar fractions obtained by following the procedure given in Example 1 may be further reacted with another amino compound, instead of a phenolic compound, to yield antioxidants of even greater complexity than those obtained by interaction of the amines and phenols or alcohols. According to this procedure, an aryl amine is reacted with aminated coal tar fraction in an autoclave and a mixture of secondary amines and poly amines, as well as other nitrogen compounds, is obtained with accompanying splitting off of ammonia.

The treatment of rubber, as herein defined, includes the incorporation of the age resisters into the rubber by milling or other working, the application thereto to the surface of a mass of unvulcanized or vulcanized rubber, or the addition of the material to rubber latex to coagulation. The term "rubber" is employed in a generic sense to include rubber itself, reclaimed rubber, gutta percha, balata, synthetic rubber, and the like, whether or not admixed with fillers, pigments, vulcanizing agents and other compounding ingredients.

Although there have been described above several examples indicative of the methods which may be followed to obtain the antioxidants to which the present invention relates, it will be understood that the invention is not limited thereto but is capable of various modifications within the scope of the appended claims by which it is intended to claim all features of patentable novelty inherent in the invention.

What I claim is:

1. A vulcanized rubber product possessing improved age-resisting properties comprising rubber and the composite reaction product obtainable by treating the mixed amines resulting from amination of a coal tar oil fraction boiling between the approximate limits of 170° C. and 350° C. with an organic hydroxyl compound.

2. A vulcanized rubber product possessing improved age-resisting properties comprising rubber and the composite reaction product obtainable by treating the mixed amines resulting from amination of a coal tar oil fraction boiling between the approximate limits of 170° C. and 350° C. with a phenolic material.

3. A vulcanized rubber product possessing improved age-resisting properties comprising rubber and the composite reaction product obtainable by treating the mixed amines resulting from amination of a coal tar oil fraction boiling between approximate limits of 170° C. and 350° C. with an alcohol.

4. The method of improving the age-resisting properties of rubber which comprises incorporating therein the composite reaction product obtainable by treating the mixed amines resulting from amination of a coal tar oil fraction boiling between the approximate limits of 170° C. and 350° C. with an organic hydroxyl compound.

5. The method of improving the age-resisting properties of rubber which comprises incorporating therein the composite reaction product obtainable by treating the mixed amines resulting from amination of a coal tar oil fraction boiling between the approximate limits of 170° C. and 350° C. with a phenolic material.

6. The method of improving the age-resisting properties of rubber which comprises incorporating therein the composite reaction product obtainable by treating the mixed amines resulting from amination of a coal tar oil fraction boiling between the approximate limits of 170° C. and 350° C. with an alcohol.

7. The method of improving the age-resisting properties of rubber which comprises incorporating therein the composite reaction product obtainable by treating the mixed amines resulting from amination of a coal tar oil fraction boiling between the approximate limits of 170° C. and 350° C. with cresols.

8. The method of improving the age-resisting properties of rubber which comprises incorporating therein the composite reaction product obtainable by treating the mixed amines resulting from amination of a coal tar oil fraction boiling between the approximate limits of 170° C. and 350° C. with beta-naphthol.

9. The method of improving the age-resisting properties of rubber which comprises incorporating therein the composite reaction product obtainable by treating the mixed amines resulting from amination of a coal tar oil fraction boiling between the approximate limits of 170° C. and 250° C. with an organic hydroxyl compound.

10. The method of improving the age-resisting properties of rubber which comprises incorporating therein the composite reaction product obtainable by treating the mixed amines resulting from amination of a coal tar oil fraction boiling between the approximate limits of 170° C. and 250° C. with a phenolic material.

11. The method of improving the age-resisting properties of rubber which comprises incorporating therein the composite reaction product obtainable by treating the mixed amines resulting from amination of a coal tar oil fraction boiling between the approximate limits of 170° C. and 250° C. with an alcohol.

12. A vulcanized rubber product possessing improved age-resisting properties comprising rubber and the composite reaction product obtainable by treating the mixed amines resulting from amination of a coal tar oil fraction boiling between the approximate limits of 170° C. and 350° C. with cresols.

13. A vulcanized rubber product possessing improved age-resisting properties comprising rubber and the composite reaction product obtainable by treating the mixed amines resulting from amination of a coal tar oil fraction boiling between the approximate limits of 170° C. and 350° C. with beta-naphthol.

14. A vulcanized rubber product possessing improved age-resisting properties comprising rubber and the composite reaction product obtainable by treating the mixed amines resulting from amination of a coal tar oil fraction boiling between the approximate limits of 170° C. and 250° C. with an organic hydroxyl compound.

15. A vulcanized rubber product possessing improved age-resisting properties comprising rubber and the composite reaction product obtainable by treating the mixed amines resulting from amination of a coal tar oil fraction boiling between the approximate limits of 170° C. and 250° C. with a phenolic material.

16. A vulcanized rubber product possessing improved age-resisting properties comprising rubber and the composite reaction product obtainable by treating the mixed amines resulting from amination of a coal tar oil fraction boiling between the approximate limits of 170° C. and 250° C. with an alcohol.

ALBERT M. CLIFFORD.